(12) United States Patent
Wilson et al.

(10) Patent No.: US 6,889,301 B1
(45) Date of Patent: May 3, 2005

(54) DATA STORAGE SYSTEM

(75) Inventors: Paul C. Wilson, Mendon, MA (US);
Scott Romano, Newton, MA (US);
Oren Mano, Framingham, MA (US);
Robert DeCrescenzo, Franklin, MA (US); Steven Kosto, Marlboro, MA (US); Waiyaki O. Buliro, Randolph, MA (US); Matthew Britt Sullivan, Holden, MA (US)

(73) Assignee: EMC Corporation, Hopkinton, MA (US)

( * ) Notice: Subject to any disclaimer, the term of this patent is extended or adjusted under 35 U.S.C. 154(b) by 192 days.

(21) Appl. No.: 10/174,115

(22) Filed: Jun. 18, 2002

(51) Int. Cl.$^7$ .............................................. G06F 12/00
(52) U.S. Cl. ........................ 711/169; 711/113; 711/117; 711/114; 711/150; 711/157; 711/212; 710/31; 710/38; 710/52; 710/54; 710/60; 710/65; 710/66; 710/62
(58) Field of Search ................................ 711/113, 117, 711/114, 150, 157, 169, 212, 111; 710/31, 38, 52, 54, 60, 65, 66

(56) References Cited

U.S. PATENT DOCUMENTS

| | | | | |
|---|---|---|---|---|
| 5,471,615 | A | * 11/1995 | Amatsu et al. | 709/202 |
| 6,609,164 | B1 | * 8/2003 | Kallat | 710/22 |
| 6,611,879 | B1 | * 8/2003 | Dobecki | 710/1 |
| 6,631,433 | B1 | * 10/2003 | Paluzzi | 710/244 |
| 6,651,130 | B1 | * 11/2003 | Thibault | 710/317 |
| 6,684,268 | B1 | * 1/2004 | Paluzzi | 710/33 |
| 6,687,797 | B1 | * 2/2004 | Walton | 711/150 |
| 6,721,864 | B2 | * 4/2004 | Keskar et al. | 711/167 |

* cited by examiner

Primary Examiner—Mano Padmanabhan
Assistant Examiner—Mehdi Namazi

(57) ABSTRACT

A data storage system for transferring data between a host computer/server and a bank of disk drives through a system interface. The interface includes: a global memory; a plurality of front-end directors coupled between the global memory and the host computer/server; and, a plurality of back-end directors coupled between the global memory and the bank of disk drives. Each one of the first directors and each one of the second directors has a data pipe. Each one of such front-end directors passes front-end data between the global memory and the host computer through the data pipe therein and each one of the second directors passing back-end data between the global memory and the bank of disk drives through the data pipe therein. Each one of the first and second directors includes a data pipe controller, responsive to data fed to the data pipe, for performing a selected one of a plurality of functions on the data passing through the data pipe to obtain data from the global memory or to read such data into the global memory. The function is determined by descriptors associated with the data fed to the data pipe therein. A plurality of different, independently operable state machines is provided. Each one of the state machines is adapted to produce control signals for a corresponding one to the functions. A switching section is coupled to the global memory for passing data therethrough between the global memory and the data pipe in accordance with the control signals produced by the state machines.

4 Claims, 12 Drawing Sheets

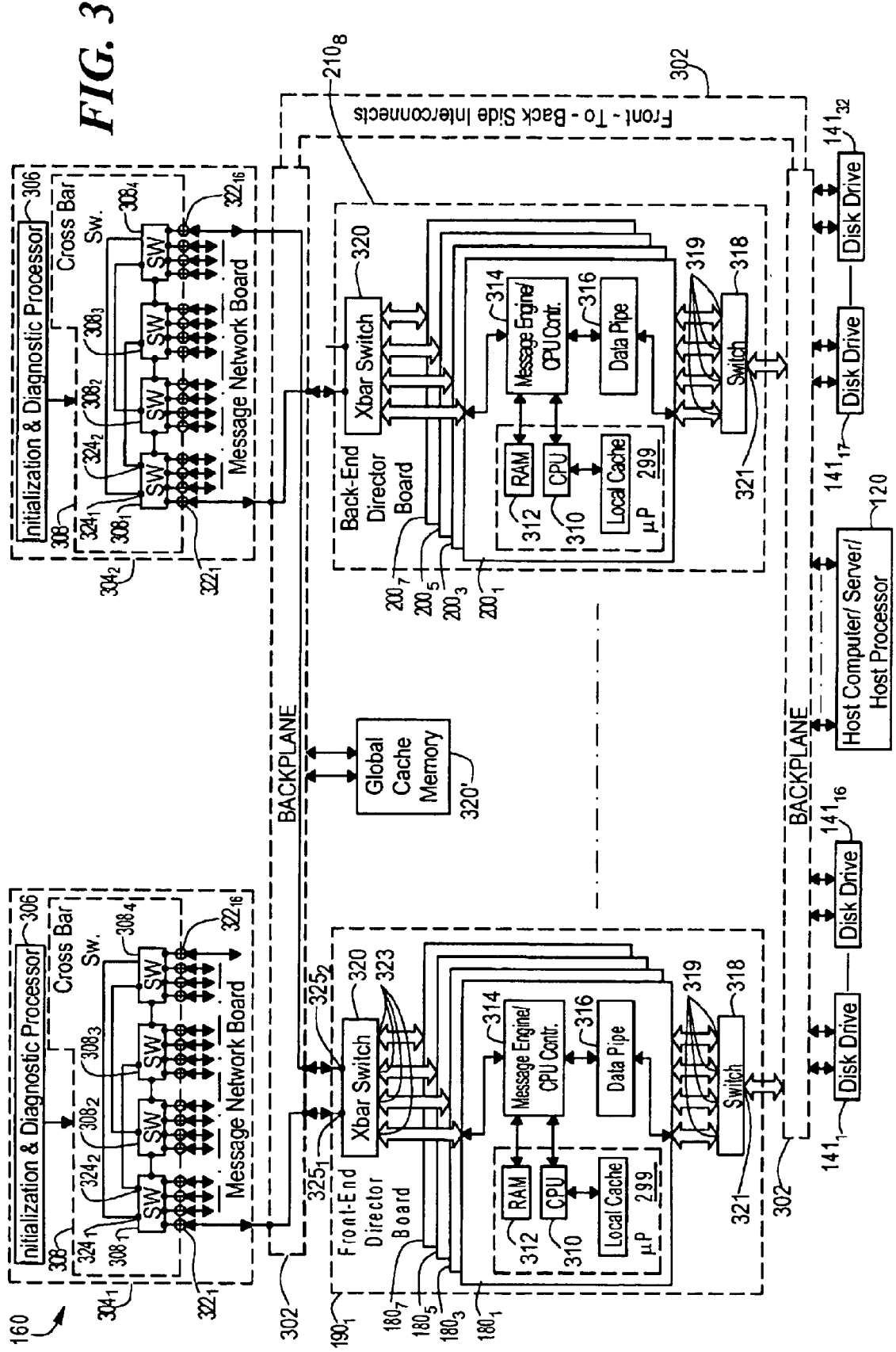

| FIG. 4A |
| FIG. 4B |

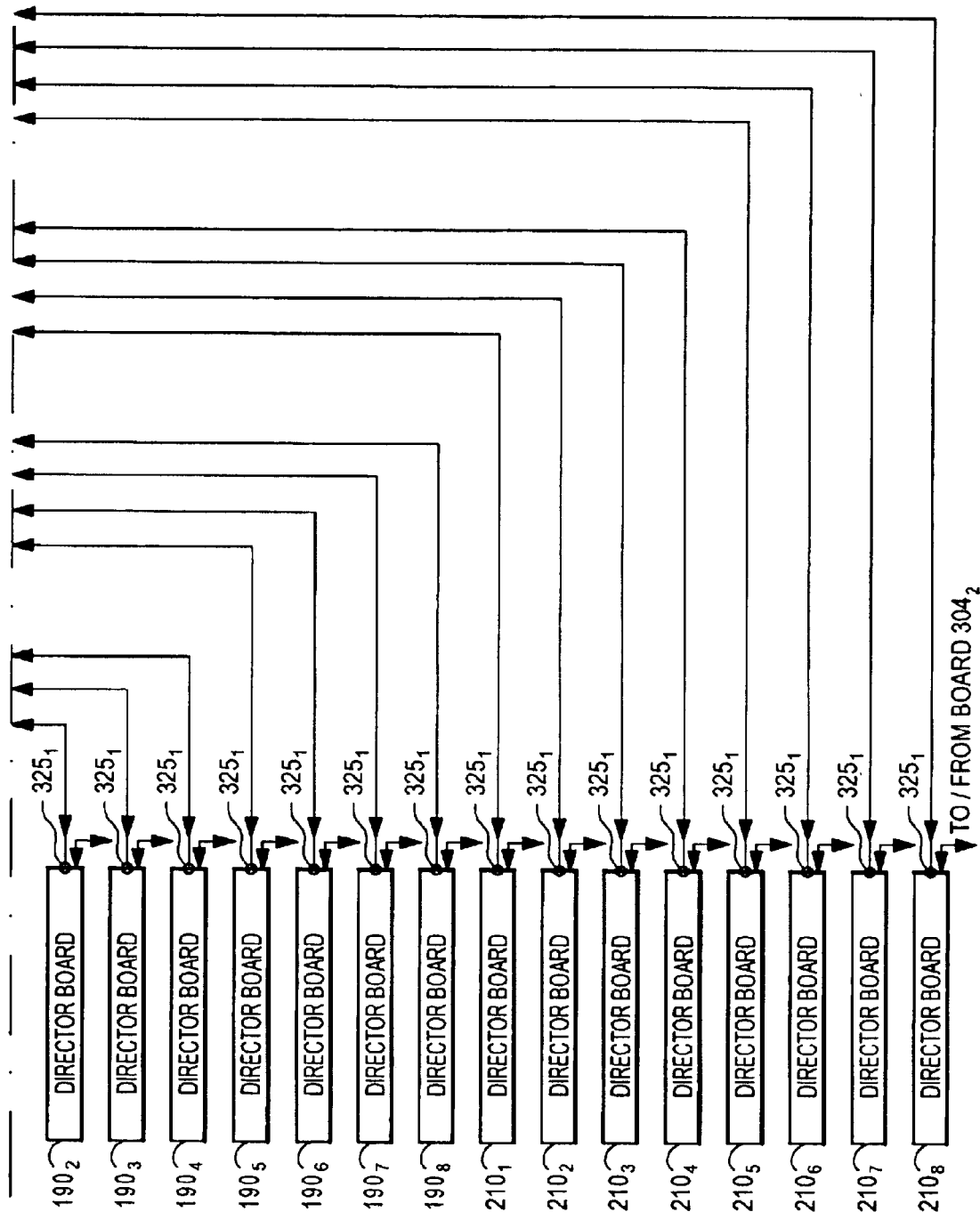

DATA STORAGE SYSTEM

This application incorporates by reference, in their entirety, the following co-pending patent applications all assigned to the same assignee as the present invention:

| INVENTORS | FILING DATE | SER. NO. | TITLE |
| --- | --- | --- | --- |
| Yuval Ofek et al. | Mar. 31, 2000 | 09/540,828 | Data Storage System Having Separate Data Transfer Section And Message Network |
| Paul C. Wilson et al. | Jun. 29, 2000 | 09/606,730 | Data Storage System Having Point-To-Point Configuration |
| John K. Walton et al. | Jan. 22, 2002 | 10/054,241 | Data Storage System (Divisional of 09/223,519 filed Dec. 30, 1998) |
| Christopher S. MacLellan et al. | Dec. 21, 2000 | 09/745,859 | Data Storage System Having Plural Fault Domains |
| John K. Walton | May 17, 2001 | 09/859,659 | Data Storage System Having No-Operation Command |
| Robert A. Thibault et al. | Mar. 28, 2002 | 10/112,598 | Data Storage System |

BACKGROUND OF THE INVENTION

This invention relates generally to data storage systems, and more particularly to data storage systems having redundancy arrangements to protect against total system failure in the event of a failure in a component or subassembly of the storage system.

As is known in the art, large host computers and servers (collectively referred to herein as "host computer/servers") require large capacity data storage systems. These large computer/servers generally includes data processors, which perform many operations on data introduced to the host computer/server through peripherals including the data storage system. The results of these operations are output to peripherals, including the storage system.

One type of data storage system is a magnetic disk storage system. Here a bank of disk drives and the host computer/server are coupled together through an interface. The interface includes "front end" or host computer/server controllers (or directors) and "back-end" or disk controllers (or directors). The interface operates the controllers (or directors) in such a way that they are transparent to the host computer/server. That is, data is stored in, and retrieved from, the bank of disk drives in such a way that the host computer/server merely thinks it is operating with its own local disk drive. One such system is described in U.S. Pat. No. 5,206,939, entitled "System and Method for Disk Mapping and Data Retrieval", inventors Moshe Yanai, Natan Vishlitzky, Bruno Alterescu and Daniel Castel, issued Apr. 27, 1993, and assigned to the same assignee as the present invention.

As described in such U.S. Patent, the interface may also include, in addition to the host computer/server controllers (or directors) and disk controllers (or directors), addressable cache memories. The cache memory is a semiconductor memory and is provided to rapidly store data from the host computer/server before storage in the disk drives, and, on the other hand, store data from the disk drives prior to being sent to the host computer/server. The cache memory being a semiconductor memory, as distinguished from a magnetic memory as in the case of the disk drives, is much faster than the disk drives in reading and writing data.

The host computer/server controllers, disk controllers and cache memory are interconnected through a backplane printed circuit board. More particularly, disk controllers are mounted on disk controller printed circuit boards. The host computer/server controllers are mounted on host computer/server controller printed circuit boards. And, cache memories are mounted on cache memory printed circuit boards. The disk directors, host computer/server directors, and cache memory printed circuit boards plug into the backplane printed circuit board. In order to provide data integrity in case of a failure in a director, the backplane printed circuit board has a pair of buses. One set the disk directors is connected to one bus and another set of the disk directors is connected to the other bus. Likewise, one set the host computer/server directors is connected to one bus and another set of the host computer/server directors is directors connected to the other bus. The cache memories are connected to both buses. Each one of the buses provides data, address and control information.

The arrangement is shown schematically in FIG. 1. Thus, the use of two buses B1, B2 provides a degree of redundancy to protect against a total system failure in the event that the controllers or disk drives connected to one bus, fail. Further, the use of two buses increases the data transfer bandwidth of the system compared to a system having a single bus. Thus, in operation, when the host computer/server 12 wishes to store data, the host computer 12 issues a write request to one of the front-end directors 14 (i.e., host computer/server directors) to perform a write command. One of the front-end directors 14 replies to the request and asks the host computer 12 for the data. After the request has passed to the requesting one of the front-end directors 14, the director 14 determines the size of the data and reserves space in the cache memory 18 to store the request. The front-end director 14 then produces control signals on one of the address memory busses B1, B2 connected to such front-end director 14 to enable the transfer to the cache memory 18. The host computer/server 12 then transfers the data to the front-end director 14. The front-end director 14 then advises the host computer/server 12 that the transfer is complete. The front-end director 14 looks up in a Table, not shown, stored in the cache memory 18 to determine which one of the back-end directors 20 (i.e., disk directors) is to handle this request. The Table maps the host computer/server 12 addresses into an address in the bank 14 of disk drives. The front-end director 14 then puts a notification in a "mail box" (not shown and stored in the cache memory 18) for the back-end director 20, which is to handle the request, the amount of the data and the disk address for the data. Other back-end directors 20 poll the cache memory 18 when they are idle to check their "mail boxes". If the polled "mail box" indicates a transfer is to be made, the back-end director 20 processes the request, addresses the disk drive in the bank 22, reads the data from the cache memory 18 and writes it into the addresses of a disk drive in the bank 22.

When data is to be read from a disk drive in bank 22 to the host computer/server 12 the system operates in a reciprocal manner. More particularly, during a read operation, a read request is instituted by the host computer/server 12 for data at specified memory locations (i.e., a requested data block). One of the front-end directors 14 receives the read request and examines the cache memory 18 to determine whether the requested data block is stored in the cache memory 18. If the requested data block is in the cache memory 18, the requested data block is read from the cache memory 18 and is sent to the host computer/server 12. If the front-end director 14 determines that the requested data block is not in the cache memory 18 (i.e., a so-called "cache miss") and the director 14 writes a note in the cache memory 18 (i.e., the "mail box") that it needs to receive the requested data block. The back-end directors 20 poll the cache memory 18 to determine whether there is an action to be taken (i.e., a read operation of the requested block of data). The one of the back-end directors 20 which poll the cache memory 18 mail box and detects a read operation reads the requested data block and initiates storage of such requested data block stored in the cache memory 18. When the storage is completely written into the cache memory 18, a read complete indication is placed in the "mail box" in the cache memory 18. It is to be noted that the front-end directors 14 are polling the cache memory 18 for read complete indications. When one of the polling front-end directors 14 detects a read complete indication, such front-end director 14 completes the transfer of the requested data which is now stored in the cache memory 18 to the host computer/server 12.

The use of mailboxes and polling requires time to transfer data between the host computer/server 12 and the bank 22 of disk drives thus reducing the operating bandwidth of the interface.

SUMMARY

In accordance with the present invention, a data storage system is provided for transferring data between a host computer/server and a bank of disk drives through a system interface. The interface includes: a global memory; a plurality of front-end directors coupled between the global memory and the host computer/server; and, a plurality of back-end directors coupled between the global memory and the bank of disk drives. Each one of the first directors and each one of the second directors has a data pipe. Each one of such front-end directors passes front-end data between the global memory and the host computer through the data pipe therein and each one of the second directors passing back-end data between the global memory and the bank of disk drives through the data pipe therein. Each one of the first and second directors includes a data pipe controller, responsive to data fed to the data pipe, for performing a selected one of a plurality of functions on the data passing through the data pipe to obtain data from the global memory or to read such data into the global memory. The function is determined by descriptors associated with the data fed to the data pipe therein. A plurality of different, independently operable state machines is provided.

Each one of the state machines is adapted to produce control signals for a corresponding one to the functions. A switching section is coupled to the global memory for passing data therethrough between the global memory and the data pipe in accordance with the control signals produced by the state machines.

In accordance with another feature of the invention, the global memory has a plurality of memory boards; and wherein the switching section includes a pair of independently controllable switches, each one of the switches is coupled to a different one of the memory boards.

In accordance with another feature of the invention, the data passes between the global memory and the directors as data transactions. Each one of the transactions is transmitted as a plurality of bursts of data. The bursts of one transaction are interleaved with bursts of other transactions. Each burst has transaction context associated therewith. The system includes a data transfer section having the global memory. A messaging network is provided. The message network operates independently of the data transfer section and is coupled to the plurality of first directors and the plurality of second directors. The first and second directors control data transfer between the host computer and the bank of disk drives in response to messages passing between the first directors and the second directors through the messaging network to facilitate the data transfer between host computer/server and the bank of disk drives with such data passing through the cache memory in the data transfer section. Each one of the first directors and each one of the second directors includes: a message engine controller for transferring the messages between the message network and such one of the first directors. The message engine controller includes a central processing unit having a microprocessor and a random access memory. The data flow controller includes: a data pipe random access memory for storing context associated with a predetermined number of transactions and a memory for maintaining the transactions having the context associated therewith stored in the data pipe memory. The data pipe controller transfers context associated with additional transactions between the data pipe random access memory and the message engine random access memory.

In one embodiment, the system includes a performance monitor for monitoring performance of each of the plurality of state machine.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

These and other features of the invention will become more readily apparent from the following detailed description when read together with the accompanying drawings, in which:

FIG. 3 is a block diagram of the system interface used in the data storage system of FIG. 2;

DETAILED DESCRIPTION

Figure 1:
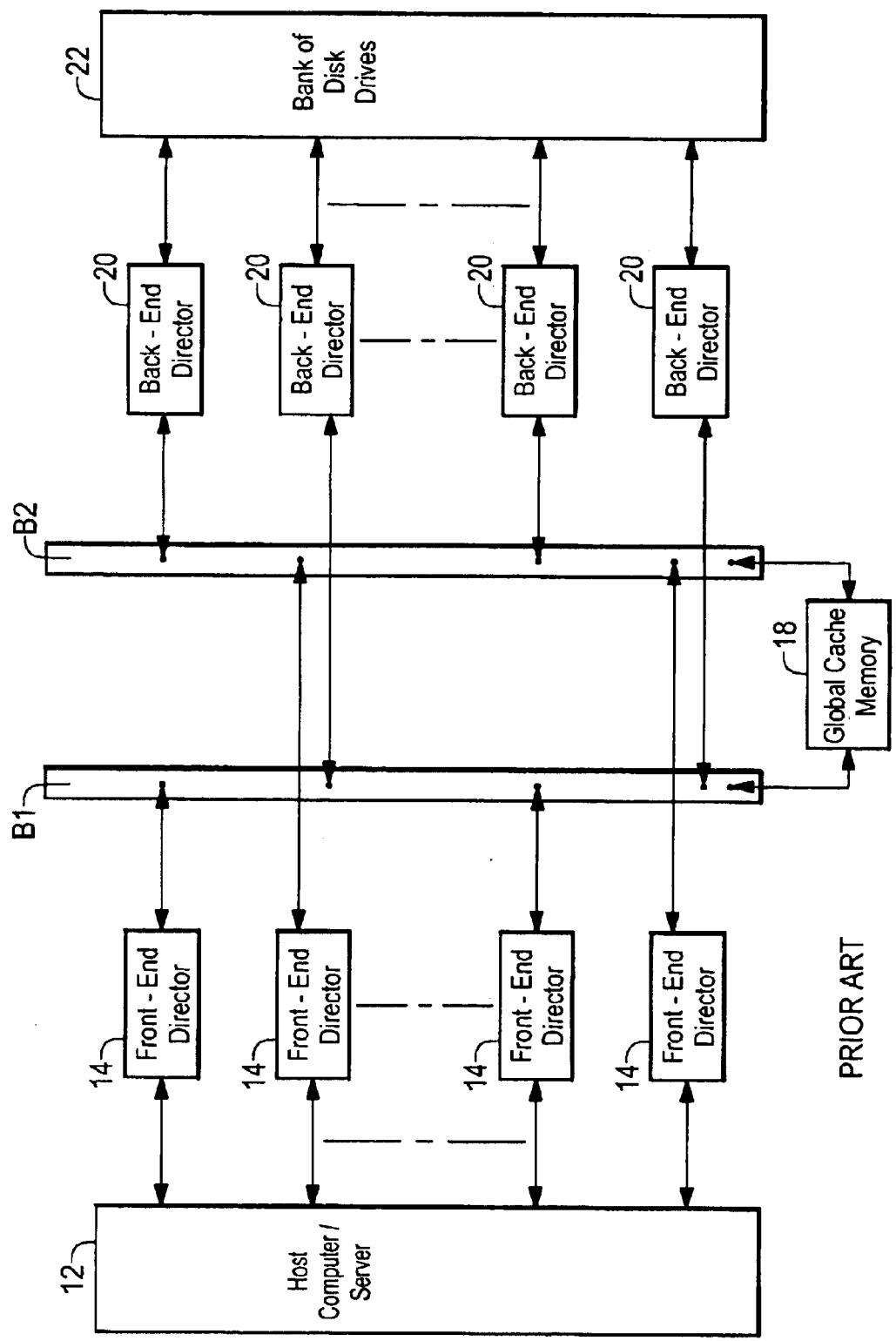
FIG. 1 is a block diagram of a data storage system according to the PRIOR ART.
Figure 2:
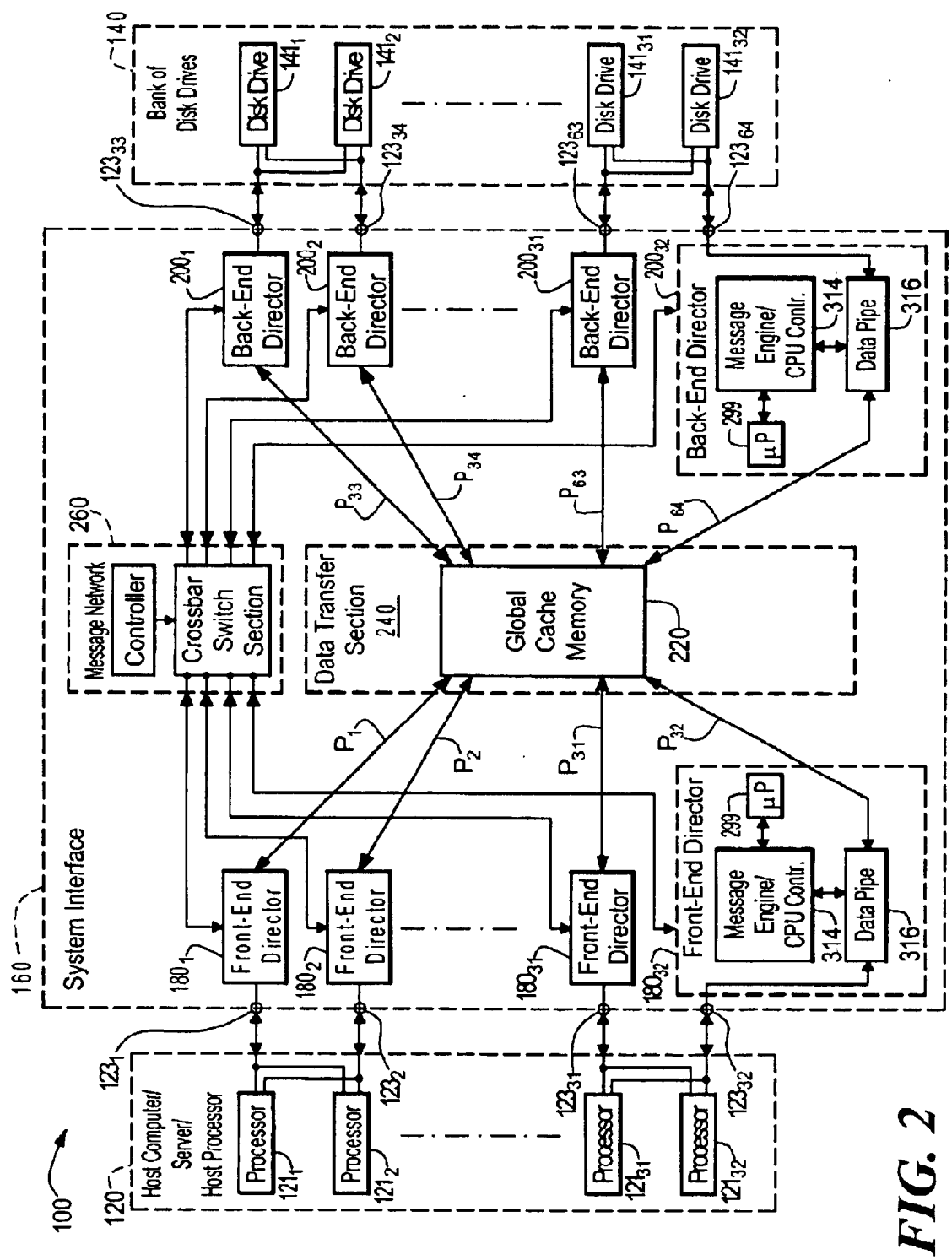
FIG. 2 is a block diagram of a data storage system according to the invention.

Referring now to FIG. 2, a data storage system 100 is shown for transferring data between a host computer/server 120 and a bank of disk drives 140 through a system interface 160. The system interface 160 includes: a plurality of, here 32 front-end directors $180_1$–$180_{32}$ coupled to the host computer/server 120 via ports $123_1$–$123_{32}$; a plurality of back-end directors $200_1$–$200_{32}$ coupled to the bank of disk drives 140 via ports $123_{33}$–$123_{64}$; a data transfer section 240, having a global cache memory 220, coupled to the plurality of front-end directors $180_1$–$180_{32}$ and the back-end directors $200_1$–$200_{32}$; and a messaging network 260, operative independently of the data transfer section 240, coupled to the plurality of front-end directors $180_1$–$180_{32}$ and the plurality of back-end directors $200_1$–$200_{32}$, as shown. The front-end and back-end directors $180_1$–$180_{32}$, $200_1$–$200_{32}$ are functionally similar and include a microprocessor ($\mu P$) 299 (i.e., a central processing unit (CPU) and RAM), a message engine/CPU controller 314 and a data pipe 316 to be described in detail in connection with FIGS. 5, 6, 7A, 7B and 7C. Suffice it to say here, however, that the front-end and back-end directors $180_1$–$180_{32}$. $200_{1-20032}$ control data transfer between the host computer/server 120 and the bank of disk drives 140 in response to messages passing between the directors $180_1$–$180_{32}$, $200_1$–$200_{32}$ through the messaging network 260. The messages facilitate the data transfer between host computer/server 120 and the bank of disk drives 140 with such data passing through the global cache memory 220 via the data transfer section 240. More particularly, in the case of the front-end directors $180_1$–$180_{32}$, the data passes between the host computer to the global cache memory 220 through the data pipe 316 in the front-end directors $180_1$–$180_{32}$ and the messages pass through the message engine/CPU controller 314 in such front-end directors $180_1$–$180_{32}$. In the case of the back-end directors $200_1$–$200_{32}$ the data passes between the back-end directors $200_1$–$200_{32}$ and the bank of disk drives 140 and the global cache memory 220 through the data pipe 316 in the back-end directors $200_1$–$200_{32}$ and again the messages pass through the message engine/CPU controller 314 in such back-end director $200_1$–$200_{32}$.

With such an arrangement, the cache memory 220 in the data transfer section 240 is not burdened with the task of transferring the director messaging. Rather the messaging network 260 operates independent of the data transfer section 240 thereby increasing the operating bandwidth of the system interface 160.

Figure 5:
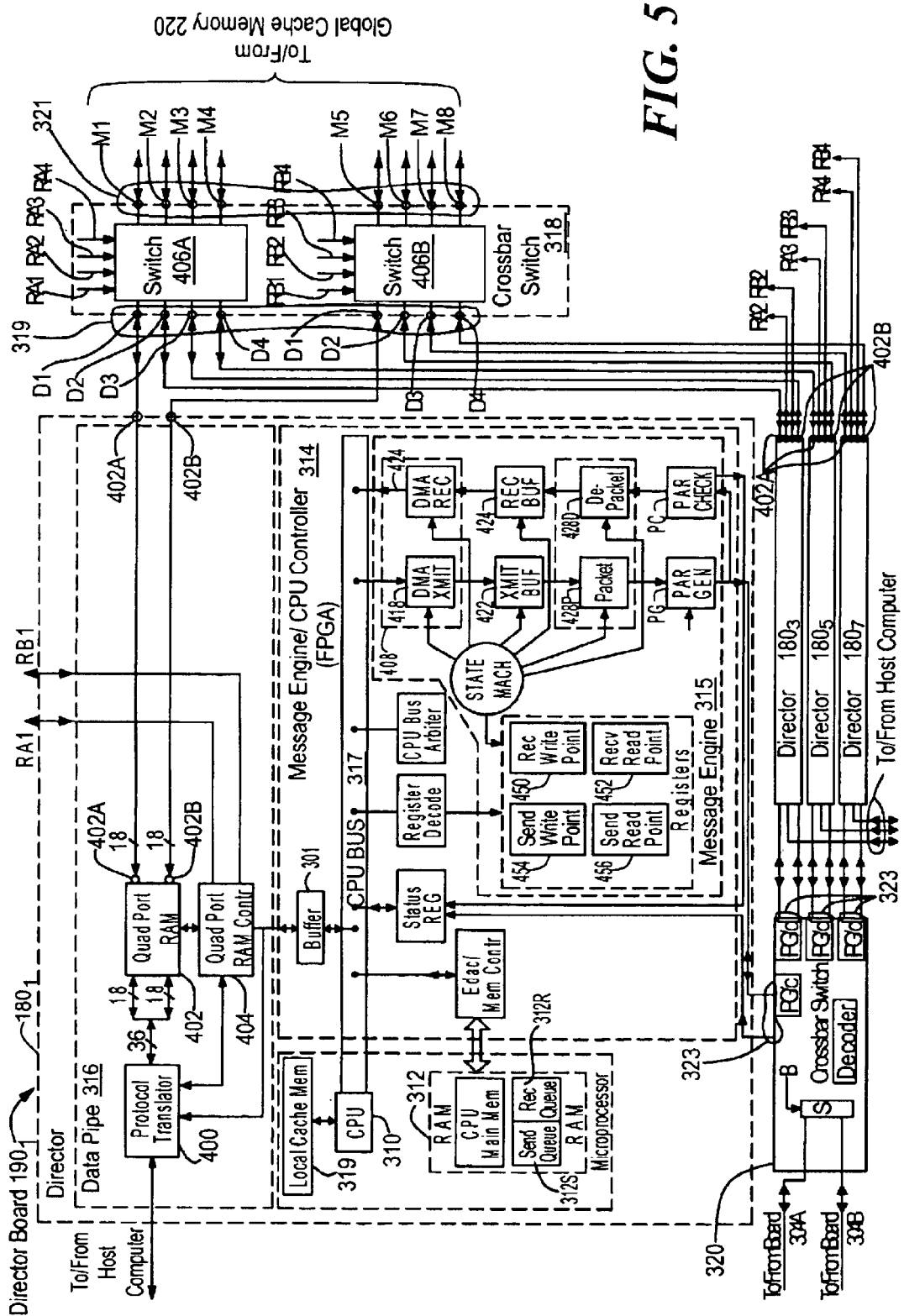
FIG. 5 is a block diagram of an exemplary one of the director boards used in the system interface of the data storage system of FIG. 2.

Each one of the directors $180_1$–$180_{32}$, $200_1$–$200_{32}$ includes a CPU 310, a RAM 312 (FIG. 5) which make up the microprocessor 299 referred to above, the message engine/CPU controller 314, and the data pipe 316. Referring to FIG. 5, each one of the director boards $190_1$–$210_8$ includes a crossbar switch 318. The crossbar switch 318 has four input/output ports 319, each one being coupled to the data pipe 316 of a corresponding one of the four directors $180_1$–$180_{32}$, $200_1$–$200_{32}$ on the director board $190_1$–$210_8$. The crossbar switch 318 has eight output/input ports collectively identified in FIG. 5 by numerical designation 321. The crossbar switch 318 on the front-end director boards $191_1$–$191_8$ is used for coupling the data pipe 316 of a selected one of the four front-end directors $180_1$–$180_{32}$ on the front-end director board $190_1$–$190_8$ to the global cache memory 220 via a backplane and I/O adapter, not shown. The crossbar switch 318 on the back-end director boards $210_1$–$210_8$ is used for coupling the data pipe 316 of a selected one of the four back-end directors $200_1$–$200_{32}$ on the back-end director board $210_1$–$210_8$ to the global cache memory 220 via the backplane and I/O adapter, not shown.

Thus, referring to FIG. 2, the data pipe 316 in the front-end directors $180_1$–$180_{32}$ couples data between the host computer 120 and the global cache memory 220 while the data pipe 316 in the back-end directors $200_1$–$200_{32}$ couples data between the bank of disk drives 140 and the global cache memory 220. It is noted that there are separate point-to-point data paths $P_1$—$P_{64}$ (FIG. 2) between each one of the directors $180_1$–$180_{32}$, $200_1$–$200_{32}$ and the global cache memory 220.

Referring again to FIG. 5, each one of the director boards 190'-2108 includes a crossbar switch 320. Each crossbar switch 320 has four input/output ports 323, each one of the four input/output ports 323 being coupled to the message engine/CPU controller 314 of a corresponding one of the four directors $180_1$–$180_{32}$, $200_1$–$200_{32}$ on the director board $190_1$–$210_8$. Each crossbar switch 320 has a pair of output/input ports $325_1$, $325_2$, which plug into the backplane 302 (FIG. 3). Each port $325_1$–$325_2$ is coupled to a corresponding one of the message network boards $304_1$, $304_2$, respectively, through the backplane. The crossbar switch 320 on the front-end director boards $190_1$–$190_8$ is used to couple the messages between the message engine/CPU controller 314 of a selected one of the four front-end directors $180_1$–$180_{32}$ on the front-end director boards $190_1$–$190_8$ and the message network 260, FIG. 2. Likewise, the back-end director boards $210_1$–$210_8$ are used to couple the messages produced by a selected one of the four back-end directors $200_1$–$200_{32}$ on the back-end director board $210_1$–$210_8$ between the message engine/CPU controller 314 of a selected one of such four back-end directors and the message network 260 (FIG. 2).

Figures 4, 4A:
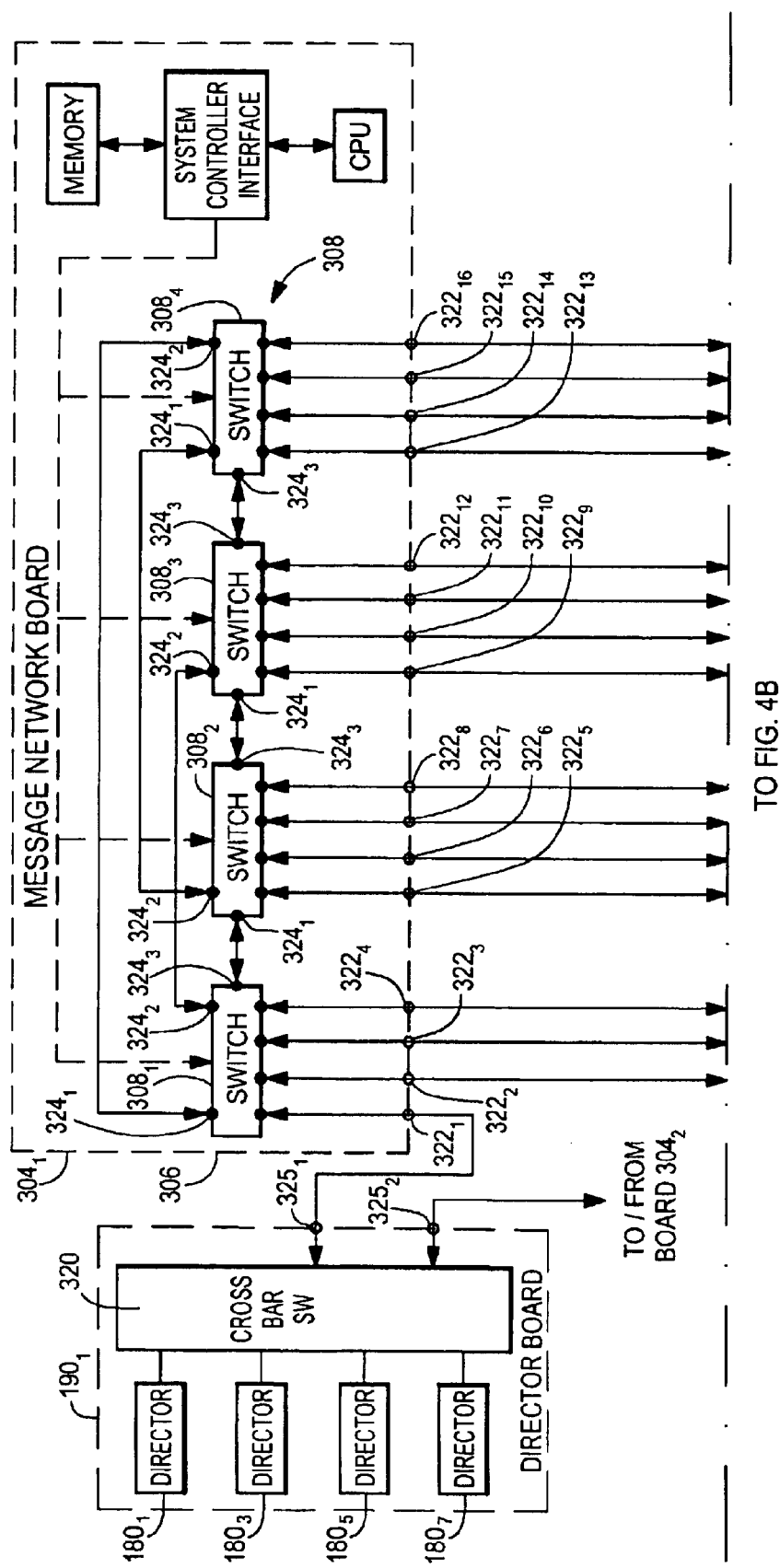
FIG. 4 is a diagram which shows the relationship between FIGS. 4A and 4B which together is a block diagram showing the connections between front-end and back-end directors to one of a pair of message network boards used in the system interface of the data storage system of FIG. 2.

As noted above, each one of the message network boards 3041, 3042 includes a processor 306 (FIG. 3) and a crossbar switch section 308 having four switches $308_1$–$308_4$, as shown in FIGS. 3 and 4. The switches $308_1$–$308_4$ are interconnected as shown so that messages can pass between any pair of the input/output ports $322_{1-32216}$. Thus, it follow that a message from any one of the front-end directors $180_1$–$180_{32}$ can be coupled to another one of the front-end directors $180_{1-18032}$ and/or to any one of the back-end directors $200_1$–$200_{32}$. Likewise, a message from any one of the back-end directors $180_1$–$180_{32}$ can be coupled to another one of the back-end directors $180_1$–$180_{32}$ and/or to any one of the front-end directors $200_1$–$200_{32}$.

Referring now to FIG. 5, an exemplary one of the director boards $190_1$–$190_8$, $210_1$–$210_8$, here director board $190_1$ is shown to include directors $180_1$, $180_3$, $180_5$ and $180_7$. An exemplary one of the directors $180_1$–$180_4$, here director $180_1$ is shown in detail to include the data pipe 316, the message engine/CPU controller 314, the RAM 312, and the CPU 310 all coupled to the CPU interface bus 317, as shown. The exemplary director $180_1$ also includes: a local cache memory 319 (which is coupled to the CPU 310); the crossbar switch 318; and, the crossbar switch 320, described briefly above in connection with FIGS. 3 and 4. The data pipe 316 includes a protocol translator 400, a quad port RAM 402 and a quad port RAM controller 404, to be described in more detail in FIG. 8, arranged as shown. Briefly, the protocol translator 400 converts between the protocol of the host computer 120, in the case of a front-end director $180_1$–$180_{32}$, (and between the protocol used by the disk drives in bank 140 in the case of a back-end director $200_1$–$200_{32}$) and the protocol between the directors $180_1$–$180_3$, $200_1$–$200_{32}$ and the global memory 220 (FIG.

2). More particularly, the protocol used the host computer 120 may, for example, be fibre channel, SCSI, ESCON or FICON, for example, as determined by the manufacture of the host computer 120 while the protocol used internal to the system interface 160 (FIG. 2) may be selected by the manufacturer of the interface 160. The quad port RAM 402 is a FIFO controlled by controller 404 in a manner to be described in more detail in connection with FIG. 8. The RAM 402 has four ports, each adapted to handle an 18 bit digital word. Here, the protocol translator 400 produces 36 bit digital words for the system interface 160 (FIG. 2) protocol, one 18 bit portion of the word is coupled to one of a pair of the ports of the quad port RAM 402 and the other 18 bit portion of the word is coupled to the other one of the pair of the ports of the quad port RAM 402. The quad port RAM has a pair of ports 402A, 402B, each one of to ports 402A, 402B being adapted to handle an 18 bit digital word. Each one of the ports 402A, 402B is independently controllable and has independent, but arbitrated, access to the memory array within the RAM 402. Data is transferred between the ports 402A, 402B and the cache memory 220 (FIG. 2) through the crossbar switch 318, as shown.

The crossbar switch 318 includes a pair of switches 406A, 406B. Each one of the switches 406A, 406B includes four input/output director-side ports $D_1$–$D_4$ (collectively referred to above in connection with FIG. 5 as port 319) and four input/output memory-side ports $M_1$–$M_4$, $M_5$–$M_8$, respectively, as indicated. The input/output memory-side ports $M_1$–$M_4$, $M_5$–$M_8$ were collectively referred to above in connection with FIG. 5 as port 317). The director-side ports $D_1$–$D_4$ of switch 406A are connected to the 402A ports of the quad port RAMs 402 in each one the directors $180_1$, $180_3$, $180_5$ and $180_7$, as indicated. Likewise, director-side ports of switch 406B are connected to the 402B ports of the quad port RAMs 402 in each one the directors $180_1$, $180_3$, $180_5$, and $180_7$, as indicated. The ports $D_1$–$D_4$ are selectively coupled to the ports $M_1$–$M_4$ in accordance with control words provided to the switch 406A by the controllers in directors $180_1$, $180_3$, $180_5$, $180_7$ on busses $R_{A1}$–$R_{A4}$, respectively, and the ports $D_1$–$D_4$ are coupled to ports $M_5$-$M_g$ in accordance with the control words provided to switch 406B by the controllers in directors $180_1$, $180_3$, $180_5$, $180_7$ on busses $R_{B1}$–$R_{B4}$, as indicated. The signals on buses $R_{A1}$–$R_{A4}$ are request signals. Thus, port 402A of any one of the directors $180_1$, $180_3$, $180_5$, $180_7$ may be coupled to any one of the ports $M_1$–$M_4$ of switch 406A, selectively in accordance with the request signals on buses $R_{A1}$–$R_{A4}$. Likewise, port 402B of any one of the directors $180_1$–$180_4$ may be coupled to any one of the ports $M_5$–$M_8$ of switch 406B, selectively in accordance with the request signals on buses $R_{B1}$–$R_{B4}$.

Figure 6:
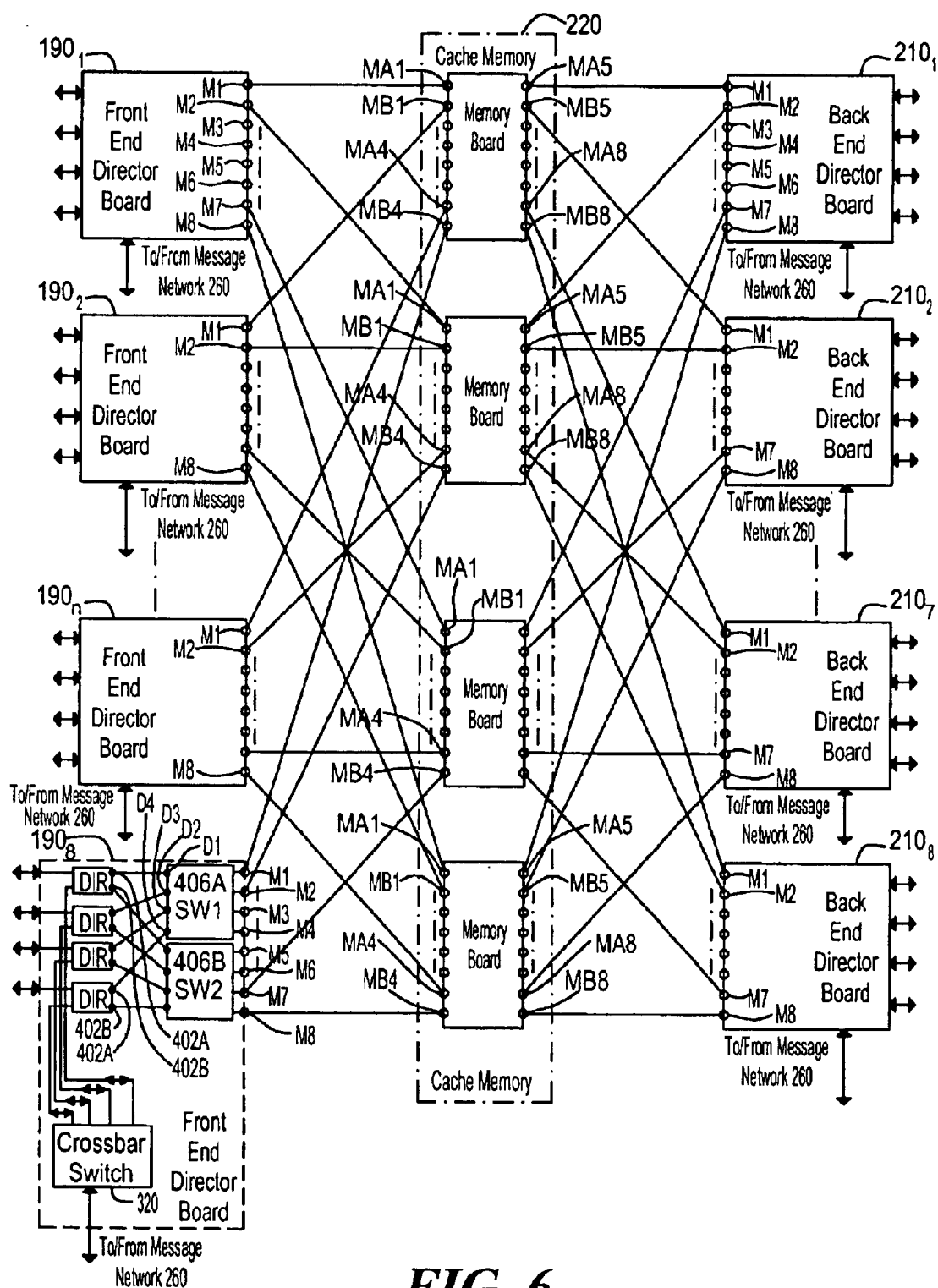
FIG. 6 is a block diagram of the system interface used in the data storage system of FIG. 2.

Referring in more detail to the crossbar switch 318 (FIG. 7B), as noted above, each one of the director boards $190_1$–$210_8$ has such a switch 318 and such switch 318 includes a pair of switches 406A, 406B. Each one of the switches 406A, 406B is identical in construction, an exemplary one thereof, here switch 406A being shown in detail in FIG. 7C. Thus switch 406A includes four input/output director-side ports $D_1$–$D_4$ as described in connection with exemplary director board 1901. Thus, for the director board $190_1$ shown in FIG. 5, the four input/output director-side ports $D_1$–$D_4$ of switch 406A are each coupled to the port 402A of a corresponding one of the directors $180_1$, $180_3$, $180_5$, and 1807 on the director board $190_1$. The coupling between the director boards $190_1$–$190_8$, $210_1$–$210_8$ and the global cache memory 220 is shown in FIG. 6.

More particularly, and referring also to FIG. 2, as noted above, each one of the host computer processors $121_1$–$121_{32}$ in the host computer 120 is coupled to a pair of the front-end directors $180_1$–$180_{32}$, to provide redundancy in the event of a failure in one of the front end-directors $181_1$–$181_{32}$ coupled thereto. Likewise, the bank of disk drives 140 has a plurality of, here 32, disk drives $141_1$–$141_{32}$, each disk drive $141_1$–$141_{32}$ being coupled to a pair of the back-end directors $200_1$–$200_{32}$, to provide redundancy in the event of a failure in one of the back-end directors $200_1$–$200_{32}$ coupled thereto). Thus, considering exemplary host computer processor 121, such processor $121_1$ is coupled to a pair of front-end directors $180_1$ $180_2$. Thus, if director 180, fails, the host computer processor 121, can still access the system interface 160, albeit by the other front-end director $180_2$. Thus, directors $180_1$ and $180_2$ are considered redundancy pairs of directors. Likewise, other redundancy pairs of front-end directors are: front-end directors $180_3$, $180_4$; $180_5$, $180_6$; $180_7$, $180_8$; $180_9$; $180_{10}$; $180_{11}$, $180_{12}$; $180_{13}$, $180_{14}$; $180_{15}$, $180_{16}$; $180_{17}$, $180_{18}$; $180_{19}$, $180_{20}$; $180_{21}$, $180_{22}$; $180_{23}$, $180_{24}$; $180_{25}$, $180_{26}$; $180_{27}$, $180_{28}$; $180_{29}$, $180_{30}$; and $180_{31}$, $180_{32}$ (only directors $180_{31}$, and $180_{32}$ being shown in FIG. 2).

Figure 7A:
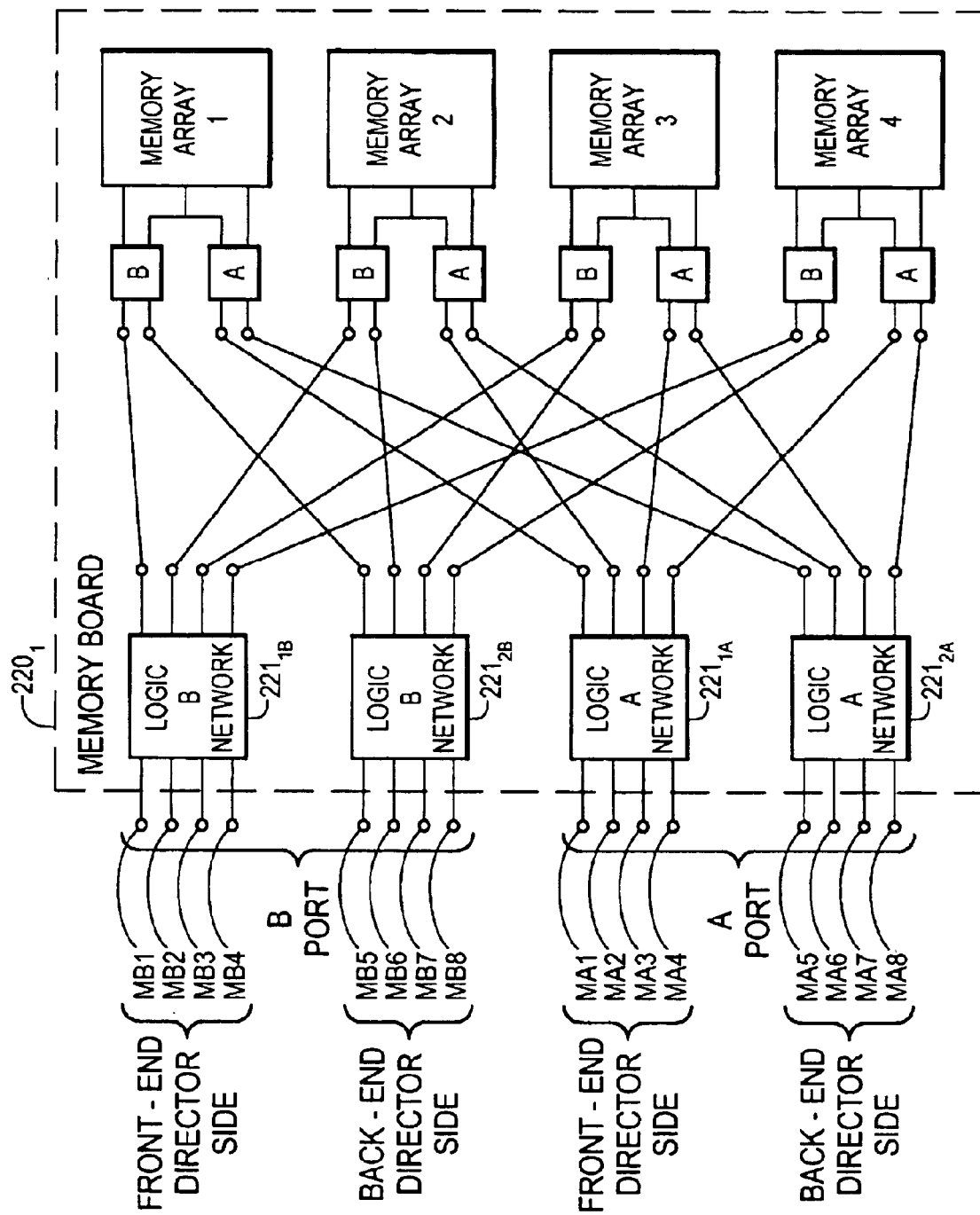
FIG. 7A is a diagram of an exemplary global cache memory board used in the system interface of FIG. 6.

Likewise, disk drive $141_1$ is coupled to a pair of back-end directors $200_1$, $200_2$. Thus, if director $200_1$, fails, the disk drive $141_1$, can still access the system interface 160, albeit by the other back-end director $180_2$. Thus, directors $200_1$ and $200_2$ are considered redundancy pairs of directors. Likewise, other redundancy pairs of back-end directors are: back-end directors $200_3$, $200_4$; $200_5$, $200_6$; $200_7$, $200_8$; $200_9$, $200_{10}$; $200_{11}$, $200_{12}$; $200_{13}$, $200_{14}$; $200_{15}$, $200_{16}$; $200_{17}$, $200_{18}$; $200_{19}$, $200_{20}$; $200_{21}$, $200_{22}$; $200_{23}$, $200_{24}$; $200_{25}$, $200_{26}$; $200_{27}$, $200_{28}$; $200_{29}$, $200_{30}$; and $200_{31}$, $200_{32}$ (only directors $200_{31}$ and $200_{32}$ being shown in FIG. 2). Further, referring also to FIG. 8, the global cache memory 220 includes a plurality of, here eight, cache memory boards $220_1$–$22_{08}$, as shown. Still further, referring to FIG. 7A, an exemplary one of the cache memory boards, here board $220_1$ is shown in detail and is described in detail in U.S. Pat. No. 5,943,287 entitled "Fault Tolerant Memory System", John K. Walton, inventor, issued Aug. 24, 1999 and assigned to the same assignee as the present invention, the entire subject matter therein being incorporated herein by reference. Thus, as shown in FIG. 7A, the board $220_1$ includes a plurality of, here four RAM memory arrays, each one of the arrays has a pair of redundant ports, i.e., an A port and a B port. The board itself has sixteen ports; a set of eight A ports $M_{A1}$–$M_{A8}$ and a set of eight B ports $M_{B1}$–$M_{B5}$. Four of the eight A port, here A ports $M_{A1}$–$M_{A4}$ are coupled to the M1 port of each of the front-end director boards $190_1$, $190_3$, $190_5$, and $190_7$, respectively, as indicated in FIG. 6. Four of the eight B port, here B ports $M_{B1-MB4}$ are coupled to the $M_1$ port of each of the front-end director boards $190_2$, $190_4$, $190_6$, and $190_8$, respectively, as indicated in FIG. 6. The other four of the eight A port, here A ports $M_{A5}$–$M_{A8}$ are coupled to the $M_1$ port of each of the back-end director boards $210_1$, $210_3$, $210_5$, and $210_7$, respectively, as indicated in FIG. 6. The other four of the eight B port, here B ports $M_{B5}$–$M_{48}$ are coupled to the $M_1$ port of each of the back-end director boards $210_2$, $210_4$, $210_6$, and $210_8$, respectively, as indicated in FIG. 6.

Considering the exemplary four A ports $M_{A1}$–$M_{A4}$, each one of the four A ports $M_{A1}$–$M_{A4}$ can be coupled to the A port of any one of the memory arrays through the logic network $221_{1A}$. Thus, considering port MAI, such port can be coupled to the A port of the four memory arrays. Likewise, considering the four A ports $M_{A5}$–$M_{A8}$, each one of the four A ports $M_{A5}$–$M_{A8}$ can be coupled to the A port of any one of the memory arrays through the logic network $221_{1B}$. Likewise, considering the four B ports $M_{B1}$–$M_{B4}$, each one of the four B ports $M_{B1}$–$M_{B4}$ can be coupled to the B port of any one of the memory arrays through logic network $221_{1B}$. Likewise, considering the four B ports $M_{B5}$–$M_{B8}$, each one of the four B ports $M_{B5}$–$M_{B5}$ can be coupled to the B port of any one of the memory arrays through the logic network $221_{1B}$. Thus, considering port $M_{B1}$, such port can be coupled to the B port of the four memory arrays. Thus, there are two paths data and control from either a front-end director $180_1$–$180_{32}$ or a back-end director $200_1$–$200_{32}$ can reach each one of the four memory arrays on the memory board. Thus, there are eight sets of redundant ports on a memory board, i.e., ports $M_{A1}$, $M_{B1}$; $M_{A2}$, $M_{B2}$; $M_{A3}$, $M_{B3}$; $M_{A4}$, $M_{B4}$; $M_{A5}$, $M_{B5}$; $M_{A6}$, $M_{B6}$; $M_{A7}$, $M_{B7}$; and $M_{A8}$, $M_{B8}$. Further, as noted above each one of the directors has a pair of redundant ports, i.e. a 402A port and a 402 B port (FIG. 5). Thus, for each pair of redundant directors, the A port (i.e., port 402A) of one of the directors in the pair is connected to one of the pair of redundant memory ports and the B port (i.e., 402B) of the other one of the directors in such pair is connected to the other one of the pair of redundant memory ports.

Figure 7B:
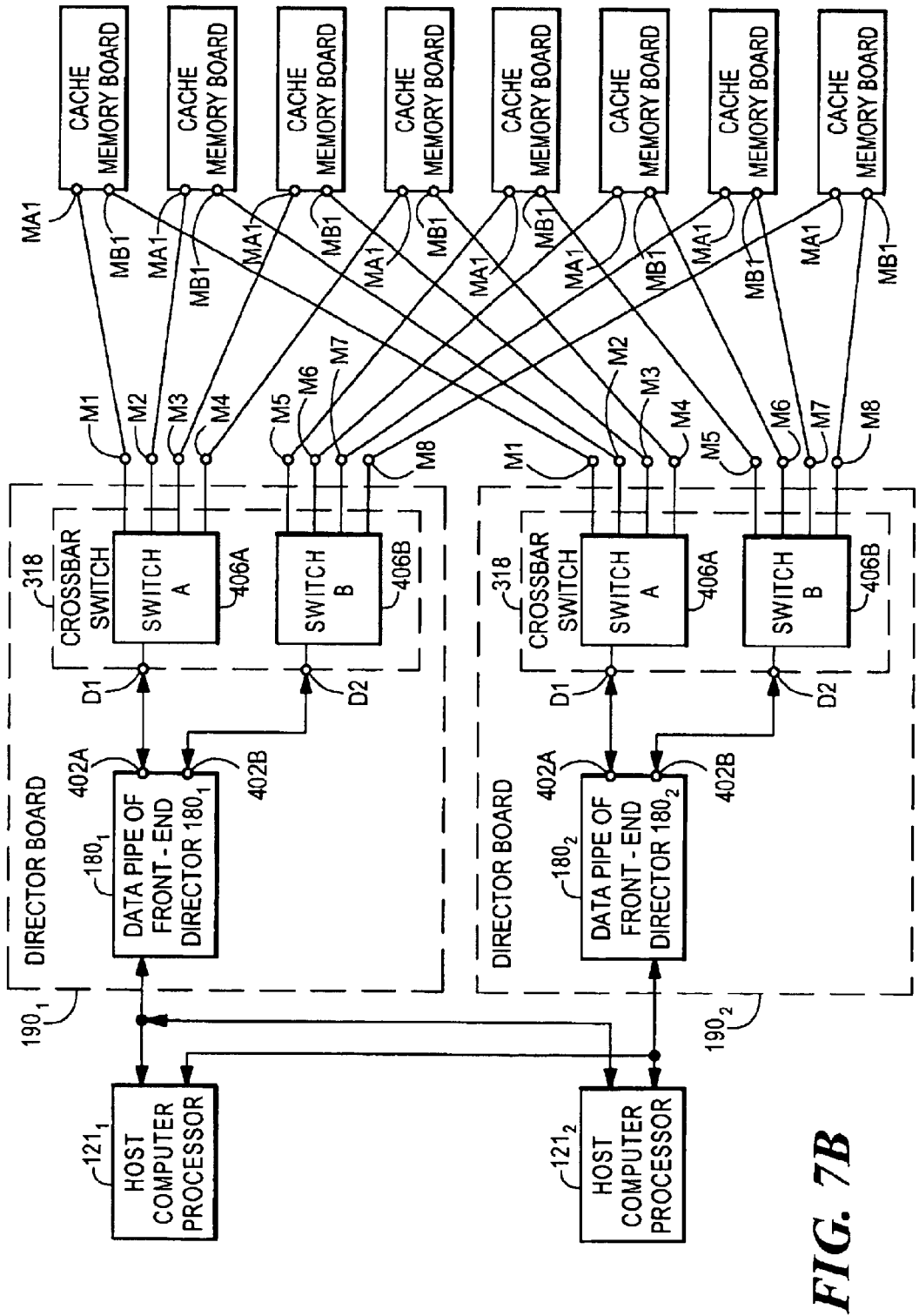
FIG. 7B is a diagram showing a pair of director boards coupled between a pair of host processors and global cache memory boards used in the system interface of FIG. 6.
Figures 1, 7C:
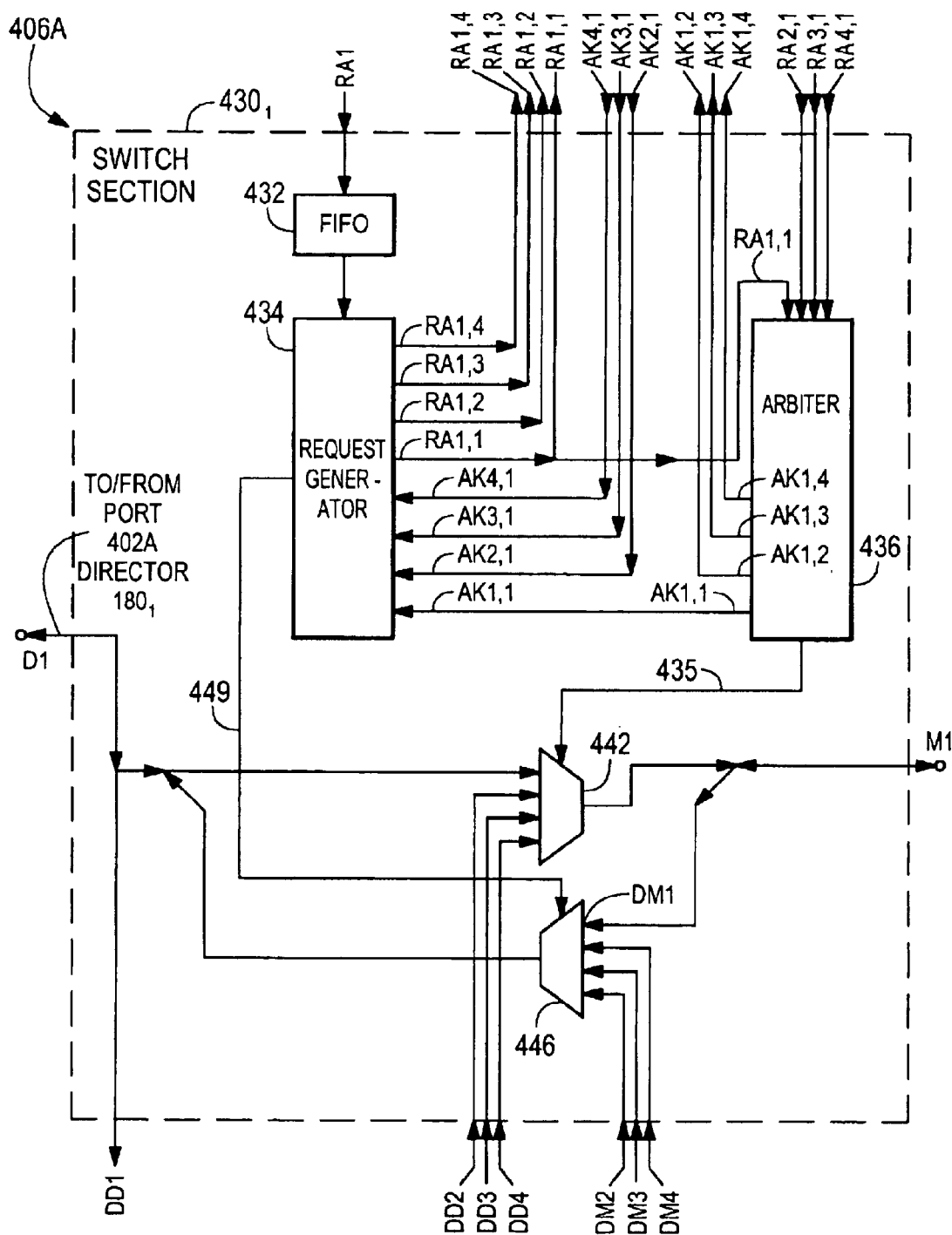
FIG. 7C is a diagram which shows the relationship between FIGS. 7C-1 and 7C-2 which together is block diagram of an exemplary crossbar switch used in the front-end and rear-end directors of the system interface of FIG. 6.
Figures 2, 7C:
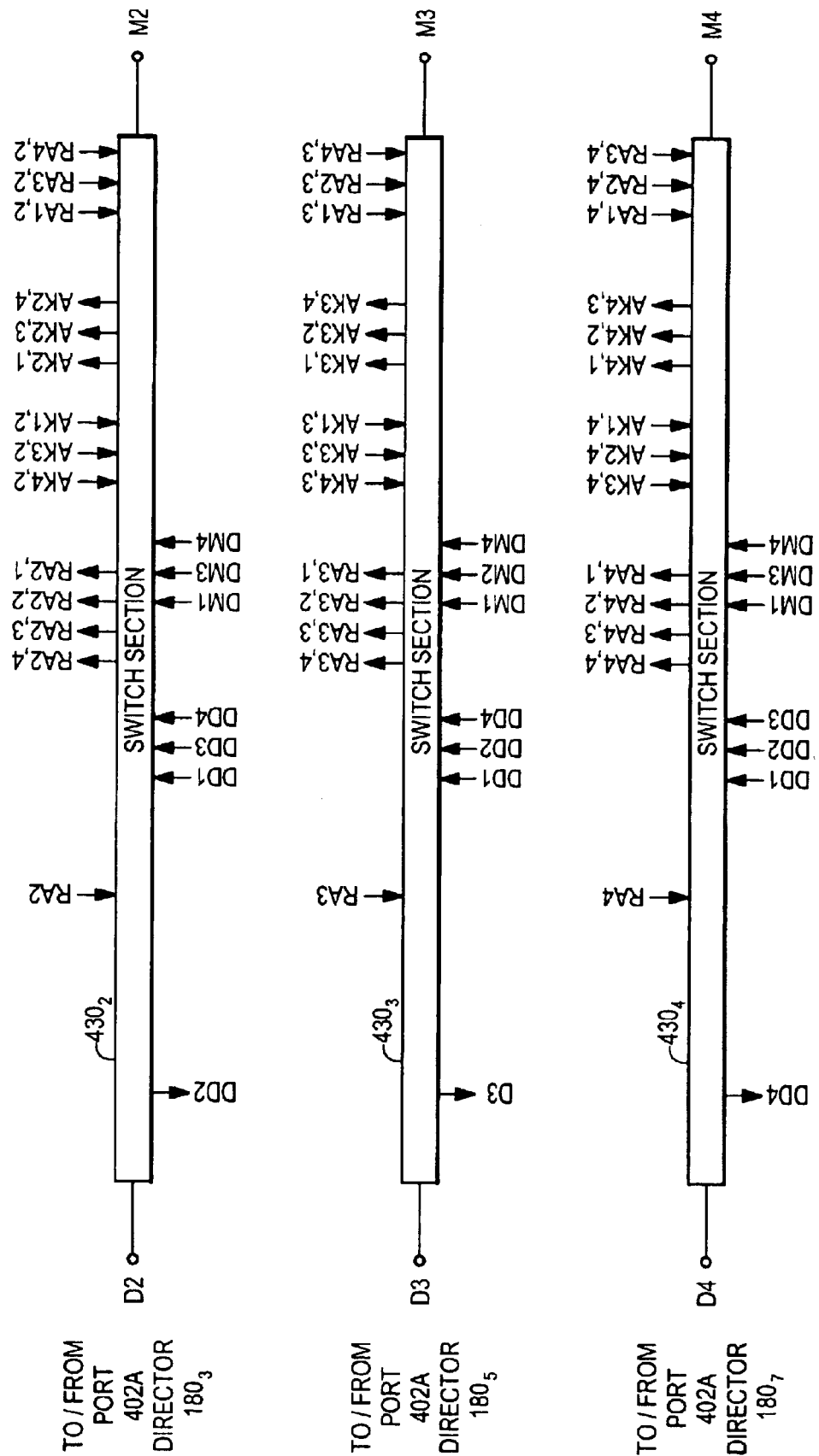

More particularly, referring to FIG. 7B, an exemplary pair of redundant directors is shown, here, for example, front-end director $180_1$ and front end-director $180_2$. It is first noted that the directors $180_1$, $180_2$ in each redundant pair of directors must be on different director boards, here boards $190_1$, $190_2$, respectively. Thus, here front-end director boards $190_1$–$190_8$ have thereon: front-end directors $180_1$, $180_3$, $180_5$ and $180_7$; front-end directors $180_2$, $180_4$, $180_6$ and $180_8$; front end directors $180_9$, $180_{11}$, $180_{13}$ and $180_{15}$; front end directors $180_{10}$, $180_{12}$, $180_{14}$ and $180_{16}$; front-end directors $180_{17}$, $180_{19}$, $180_{21}$, and $180_{23}$; front-end directors $180_{18}$, $180_{20}$, $180_{22}$ and $180_{24}$; front-end directors $180_{25}$, $180_{27}$, $180_{29}$ and $180_{31}$; front-end directors $180_{18}$, $180_{20}$, $180_{22}$ and $180_{24}$. Thus, here back-end director boards $210_1$–$210_8$ have thereon: back-end directors $200_1$, $200_3$, $200_5$ and $200_7$; back-end directors $200_2$, $200_4$, $200_6$ and $200_8$; back-end directors $200_9$, $200_{11}$, $200_{13}$ and $200_{15}$; back-end directors $200_{10}$, $200_{12}$, $200_{14}$ and $200_{16}$; back-end directors $200_{17}$, $200_{19}$, $200_{21}$, and $200_{23}$; back-end directors $200_{18}$, $200_{20}$, $200_{22}$ and $200_{24}$; back-end directors $200_{25}$, $200_{27}$, $200_{29}$ and $200_{31}$; back-end directors $200_{18}$, $200_{20}$, $200_{22}$ and $200_{24}$;

Thus, here front-end director $180_1$, shown in FIG. 7A, is on front-end director board $190_1$ and its redundant front-end director $180_2$, shown in FIG. 7B, is on another front-end director board, here for example, front-end director board $190_2$. As described above, the port 402A of the quad port RAM 402 (i.e., the A port referred to above) is connected to switch 406A of crossbar switch 318 and the port 402B of the quad port RAM 402 (i.e., the B port referred to above) is connected to switch 406B of crossbar switch 318. Likewise, for redundant director $180_2$, However, the ports $M_1$–$M_4$ of switch 406A of director $180_1$ are connected to the $M_{A1}$ ports of global cache memory boards $220_1$–$200_4$, as shown, while for its redundancy director $180_2$, the ports $M_1$–$M_4$ of switch 406A are connected to the redundant $M_{B1}$ ports of global cache memory boards $220_1$–$200_4$, as shown.

Referring again to FIG. 7C, the exemplary switch 406A includes a plurality of, here four, switch sections $430_1$–$430_4$. Each one of the switch sections $430_1$–$430_4$ is identical in construction and is coupled between a corresponding one of the input/output director-side ports $D_1$–$D_4$ and a corresponding one of the output/input memory-side ports $M_1$–$M_4$, respectively, as shown. (It should be understood that the output/input memory-side ports of switch 406B (FIG. 5) are designated as ports $M_5$–$M_8$, as shown. It should also be understood that while switch 406A is responsive to request signals on busses $R_{A1}$–$R_{A4}$ from quad port controller 404 (FIG. 8) in directors $180_1$, $180_3$, $180_5$, $180_7$ (FIG. 5), switch 406B is responsive in like manner to request signals on busses $R_{B1}$–$R_{B4}$ from controller 404 in directors $180_1$, $180_3$, $180_5$ and $180_7$). More particularly, controller 404 of director $180_1$ produces request signals on busses $R_{A1}$ or $R_{B1}$. In like manner, controller 404 of director $180_3$ produces request signals on busses $R_{A2}$ or $R_{B2}$, controller 404 of director 1805 produces request signals on busses $R_{A3}$ or $R_{B3}$, and controller 404 of director 1807 produces request signals on busses $R_{A4}$ or $R_{B4}$.

Considering exemplary switch section 4301, such switch section 403, is shown in FIG. 7 to include a FIFO 432 fed by the request signal on bus $R_{1A}$. (It should be understood that the FIFOs, not shown, in switch sections $430_2$–$430_4$ are fed by request signals $R_{A2}$–$R_{A4}$, respectively). The switch section $406_1$ also includes a request generation 434, and arbiter 436, and selectors 442 and 446, all arranged as shown. The data at the memory-side ports $M_1$–$M_4$ are on busses DM1–DM4 are fed as inputs to selector 446. Also fed to selector 446 is a control signal produced by the request generator on bus 449 in response to the request signal $R_{A1}$ stored in FIFO 432. The control signal on bus 449 indicates to the selector 446 the one of the memory-side ports $M_1$–$M_4$ which is to be coupled to director-side port $D_1$. The other switch sections $430_2$–$430_4$ operate in like manner with regard to director-side ports $D_1$–$D_4$, respectively and the memory-side ports $M_1$–$M_4$.

It is to be noted that the data portion of the word at port $D_1$ (i.e., the word on bus DD1) is also coupled to the other switch sections $430_2$–$430_4$. It is further noted that the data portion of the words at ports $D_2$–$D_4$ (i.e., the words on busses DD2–DD4, respectively), are fed to the switch sections $430_1$–$430_4$, as indicated. That is, each one of the switch sections $430_1$–$430_4$ has the data portion of the words on ports $D_1$–$D_4$ (i.e., busses DD1–DD4), as indicated. It is also noted that the data portion of the word at port $M_1$ (i.e., the word on bus DM1) is also coupled to the other switch sections $430_2$–$430_4$. It if further noted that the data portion of the words at ports $M_2$–$M_4$ (i.e., the words on busses DM2–DM4, respectively), are fed to the switch sections $430_2$–$430_4$, as indicated. That is, each one of the switch sections $430_1$–$430_4$ has the data portion of the words on ports $M_1$–$M_4$ (i.e., busses DM1–DM4), as indicated.

As will be described in more detail below, a request on bus $R_{A1}$ to switch section $430_1$ is a request from the director $180_1$ which identifies the one of the four ports $M_1$–$M_4$ in switch 430, is to be coupled to port 402A of director $180_1$ (director side port $D_1$). Thus, port 402A of director $180_1$ may be coupled to one of the memory side ports $M_1$–$M_4$ selectively in accordance with the data on bus $R_{A1}$. Likewise, a request on busses $R_{A2}$, $R_{A3}$, $R_{A4}$ to switch section $430_2$–$430_4$, respectively, are requests from the directors 1803, 1805, and 1807, respectively, which identifies the one of the four ports $M_1$–$M_4$ in switch $430_1$–$430_4$ is to be coupled to port 402A of directors 1803, 1805 and 1807, respectively.

More particularly, the requests $R_{A1}$ are stored as they are produced by the quad port RAM controller 404 (FIG. 5) in receive FIFO 432. The request generator 434 receives from FIFO 432 the requests and determines which one of the four memory-side ports $M_1$–$M_4$ is to be coupled to port 402A of director $180_1$. These requests for memory-side ports $M_1$–$M_4$ are produced on lines RA1,1–RA1,4, respectively. Thus, line RA1,1 (i.e., the request for memory side port $M_1$) is fed to arbiter 436 and the requests from switch sections $430_2$–$430_4$ (which are coupled to port 402A of directors $180_3$, $180_5$, and $180_7$) on line RA2,1, RA3,1 and RA4,1, respectively are also fed to the arbiter 436 (FIG. 7), as indicated. The arbiter 436 resolves multiple requests for memory-side port $M_1$ on a first come-first serve basis. The arbiter 436 then produces a control signal on bus 435 indicating the one of the directors 1801, 1803, 1805 or 1807 which is to be coupled to memory-side port $M_1$.

The control signal on bus 435 is fed to selector 442. Also fed to selector 442 are the data portion of the data at port $D_1$, i.e., the data on data bus DD1) along with the data portion of the data at ports $D_2$–$D_4$, i.e., the data on data busses DD2–DD4, respectively, as indicated. Thus, the control signal on bus 435 causes the selector 442 to couple to the output thereof the data busses DD1–DD4 from the one of the directors 1801, 1803, 1805, 1807 being granted access to memory-side port $M_1$ by the arbiter 436. The selected outputs of selector 442 is coupled to memory-side port $M_1$. It should be noted that when the arbiter 436 receives a request via the signals on lines RA1,1, RA2,1, RA3,1 and RA4,1, acknowledgements are returned by the arbiter 436 via acknowledgement signals on line AK1,1, AK1,2, AK1,3, AK1,4, respectively such signals being fed to the request generators 434 in switch section $430_1$, $430_2$, $430_3$, $430_4$, respectively.

Thus, the data on any port $D_1$–$D_4$ can be coupled to and one of the ports $M_1$–$M_4$ to effectuate the point-to-point data paths $P_1$–$P_{64}$ described above in connection with FIG. 2.

Referring again to FIGS. 2, 5, and 8, data from host computer 120 (FIG. 2) is presented to the system interface 160 (FIG. 2) in batches from many host computer processors $121_{1-12132}$. Thus, the data from the host computer processors $121_{1-12132}$ are interleaved with each other as they are presented to a director 180'-18032. The batch from each host computer processor $180_1$–$180_{32}$ (i.e., source) is tagged by the protocol translator 400. More particularly by a Tachyon ASIC in the case of a fibre channel connection. The controller 404 has a look-up table formed during initialization. As the data comes into the protocol translator 400 and is put into the quad port RAM 420 under the control of controller 404, to be described in more detail in FIG. 8, the protocol translator 400 informs the controller that the data is in the quad port RAM 420. The controller 404 looks at the configuration of its look-up table to determine the global cache memory 220 location (e.g., cache memory board $220_1$–$220_8$) the data is to be stored into. The controller 404 thus produces the request signals on the appropriate bus $R_{A1}$, $R_{B1}$, and then tells the quad port RAM 402 that there is a block of data at a particular location in the quad port RAM 402, move it to the particular location in the global cache memory 220. The crossbar switch 318 also takes a look at what other controllers 404 in the directors $180_3$, $180_5$, and $180_7$ on that particular director board $190_1$ are asking by making request signal on busses $R_{A2}$, $R_{B2}$, $R_{A3}$, $R_{B3}$, $R_{A4}$, $R_{B4}$, respectively. The arbitration of multiple requests is handled by the arbiter 436 as described above in connection with FIG. 7C.

Referring again to FIG. 5, the exemplary director $180_1$ is shown to include in the message engine/CPU controller 314. The message engine/CPU controller 314 is contained in a field programmable gate array (FPGA). The message engine (ME) 315 is coupled to the CPU bus 317 and the DMA section 408 as shown. The message engine (ME) 315 includes a Direct Memory Access (DMA) section 408, a message engine (ME) state machine 410, a transmit buffer 424 and receive buffer 424, a MAC packetizer/depacketizer 428, send and receive pointer registers 420, and a parity generator 321. The DMA section 408 includes a DMA transmitter 418 and a DMA receiver 424, each of which is coupled to the CPU bus interface 317, as shown in FIG. 7. The message engine (ME) 315 includes a transmit data buffer 422 coupled to the DMA transmitter 418, a receive data buffer 424 coupled to the DMA receiver 421, registers 420 coupled to the CPU bus 317 through an address decoder 401, the packetizer/de-packetizer 428, described above, coupled to the transmit data buffer 422, the receive data buffer 424 and the crossbar switch 320, as shown, and a parity generator 321 coupled between the transmit data buffer 422 and the crossbar switch 320. More particularly, the packetizer portion 428P is used to packetize the message payload into a MAC packet passing from the transmit data buffer 422 to the crossbar switch 320 and the de-packetizer portion 428D is used to de-packetize the MAC packet into message payload data passing from the crossbar switch 320 to the receive data buffer 424. The packetization is here performed by a MAC core which builds a MAC packet and appends to each message such things as a source and destination address designation indicating the director sending and receiving the message and a cyclic redundancy check (CRC), as described above. The message engine (ME) 315 also includes: a receive write pointer 450, a receive read pointer 452; a send write pointer 454, and a send read pointer 456. Further details are provided in co-pending patent application Ser. No. 09/474,886 filed Dec. 29, 1999 the entire subject matter thereof being incorporated herein by reference.

Figure 8:
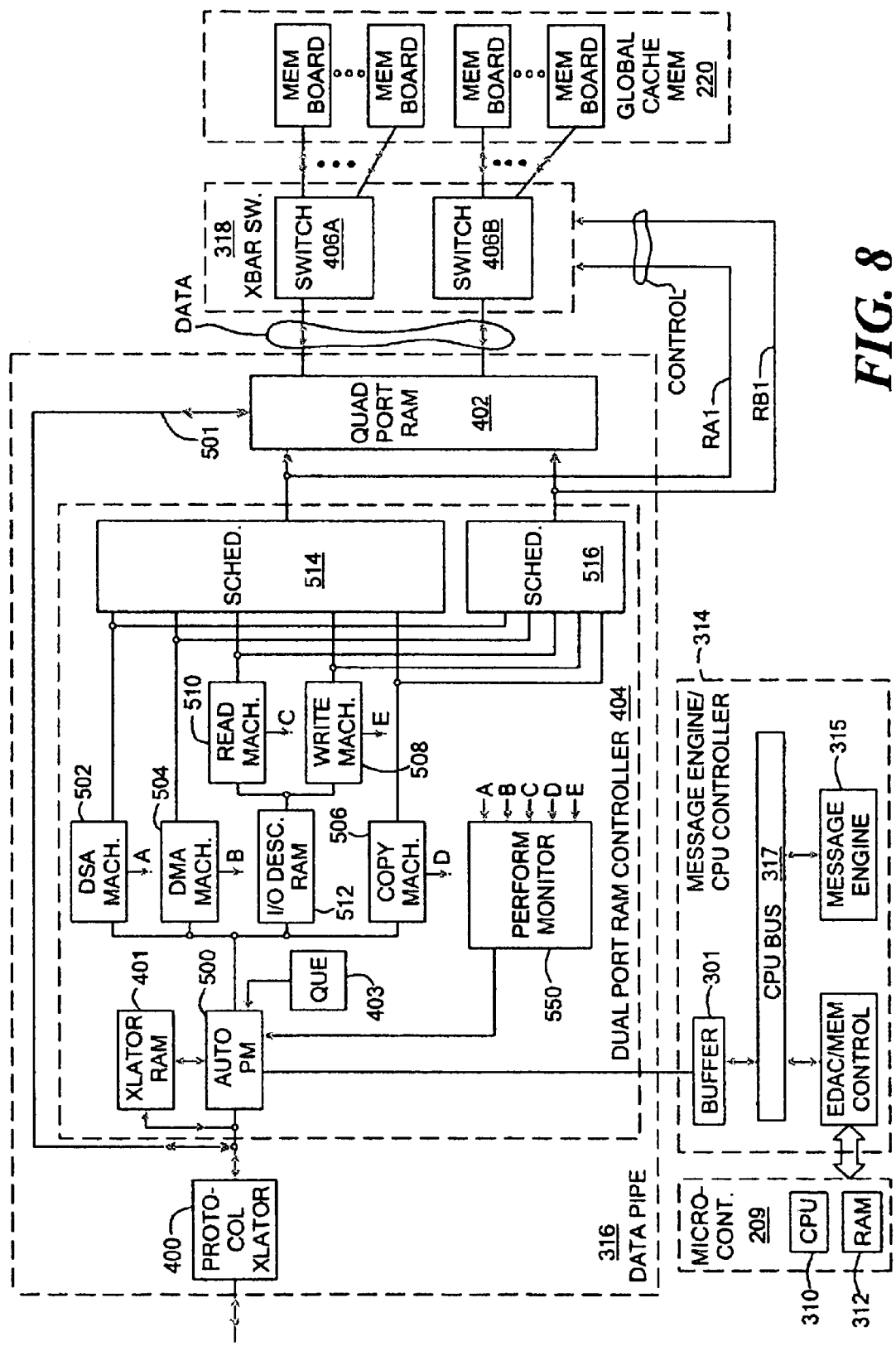
FIG. 8 is block diagram a data pipe coupled to the crossbar switch of FIG. 7C and a message engine controller used in one of directors on the director board of FIG. 7.

Referring now to FIG. 8, the dual port RAM controller 404 is shown to include an autoPM 500, here a state machine, coupled between a plurality of state machines, here a DSA state machine 502, a DMA state machine 504, a copy state machine 506, a write state machine 508 and a read state machine 510. The write and read state machines 508 and 510 are coupled to the autoPM 500 though an I/O transaction descriptor RAM 512, as shown. There is an arbitrator, not shown, to arbitrate which one of the write or write state machines 508, 512 has access to the I/O transaction descriptor RAM 512.

It is first noted that there are data transactions T1, T2, T3 etc between the disk drives and the CPU/host computer processors. Each one of these transactions T1, T2, T3 etc is made up of a plurality of bursts. The individual burst of one transaction may be interspersed with the individual burst of other transactions. Thus, for example, if there are transactions T1, T2, T3 and T4, transaction T1 may have, for example, bursts T1B1, T1B2, T1B3, T1B4 while transaction T2 may have bursts, T2B1, T2B2, T3B3 and transaction T4 bursts T4B1, T4B2, T4B3, T4B4. Thus, the data between the host computer and disk drives may be sent as: T1B1, T3B1, T2B1, T1B2, T4B1, T2B2, T1B3, T4B2, etc.

Each one of the state machines 502, 504, 506, 508, 510 is adapted to perform a specific function and can perform that function independently of, and simultaneously with, any of the other state machines 502, 504, 506, 508, 510. Thus, the read state machine 510 controls data transfers from the global memory 220. The write state machine 508 controls data transfers to the global memory 220. The copy state machine 506 enables data from one memory board of the global memory 220 to be transferred to another memory board of the global memory 220. The DSA state machine 502 enables a single transaction to be transferred to, or from, the global memory 220. The DMA state machine 504 enables transactions by the CPU 310 to be transferred to, or from, the global memory 220.

The DSA and DMA functions are further described in U.S. Pat. No. 6,317,805, issued Nov. 13, 2001, inventor Chilton et al., entitled "Data Transfer Interface Having Protocol Conversion Device and Upper, Lower, Middle Machines: With Middle Machine Arbitrating Among Lower Machine Side Requesters Including Selective Assembly/Disassembly Requests", assigned to the same assignee as the present invention, the entire subject matter thereof being incorporated herein by reference. Suffice it to say here that the plurality of state machines 502, 504, 506, 508, 510 control each of the switches 406A and 406B via the schedulers 514, 516.

In any event, it is noted that two functions can be occurring at the same time. The schedulers 514, 516 develop the control signals RA1 and RB 1 for the switches 406A and 406B, as described above to effect the desired function. The schedulers 514, 516 arbitrate for access to the switches 406A and 406B. Here the arbitration priority is: DSA, DMA, read or write, copy.

As noted above, each one of these transactions T1, T2, T3 etc is made up of a plurality of bursts. The individual burst of one transaction may be interspersed with the individual burst of other transactions. Thus, for example, if there are transactions T1, T2, T3 and T4, transaction T1 may have, for example, bursts T1B1, T1B2, T1B3, T1B4 while transaction T2 may have bursts, T2B1, T2B2, T3B3 and transaction T4 bursts T4B1, T4B2, T4B3, T44. Thus, the data between the host computer and disk drives may be sent as: T1B1, T3B1, T2B1, T1B2, T4B1, T2B2, T1B3, T4B2, etc. The status, or context, messages associated with of each transaction between the director/global cache memory must be stored after the last burst associated with each transaction. These context messages include control information to effect the transaction, global memory address, transfer length, and status. Because of the large amount of such context messages, while some portion may be stored in the I/O descriptor RAM 512 until the transaction is complete or until there is no longer storage available, another portion is stored in the CPU main memory 312. The transfer between the main memory 312 and the I/O descriptor RAM 512 is under the control of the autoPM 500.

In operation, when a transaction is presented to the protocol translator 400, the protocol translator 400 looks in the translator RAM 401 to determine whether this is a new transaction, an active or existing transaction, or a swapped transaction. Assuming here that it is a new transaction. The auto PM machine 500 loads the descriptors associated with the new transaction into the I/O transaction RAM 401 and changes the state in the translator RAM 401 to active indicating that this transaction is now an existing transaction. The descriptors are the context of the transaction, i.e., the necessary information to preserve the state of the transaction, e.g., the translated address being used by the global cache memory 220. The I/O descriptor RAM 512 thus stores the context for each transaction as the transactions are transferred to the global memory cache 220 as a series of bursts as described above. Thus, on a per burst basis, these stored context are presented to the state machines.

Now, the protocol translator 400 can start moving data to the quad port RAM 402 via bus 501. The control of the flow of data from the quad port RAM 402 to the global cache memory 220 is through the switch 318 under control of control signals, described above in connection with FIG. 8C, produced by the schedulers 514, 516 in response to the state machines 502, 504, 506, 508, 510. The particular state machine 502, 504, 506, 508, 510 to perform the transaction is a function of the descriptor associated with the transaction as presented by the protocol translator 400. Thus, the transactions may be a direct memory access DMA operation in which case the control signals to effect the transaction are provided by the DMA state machine 504. If the transaction is to be a DSA transaction, the DSA state machine 502 provides the control signals to effect the DSA transaction. Likewise for the other state machines 506, 508, 510.

It is noted that because the dual port RAM 402 is coupled to two switches 406A and 406B, data from the protocol translator 400 may be coupled to two different memory boards of the global cache memory 220 simultaneously. Thus, two operations can be performed at the same time, e.g., a DMA to one memory board and a DSA to another memory board. Further, if one memory boards is to be replaced, the data in the memory board to be replaced can pass from that memory board to the quad port RAM through one of the switches and then to another memory board through another one of the switches under control of the copy state machine. When the entire transaction is complete, an entry is made into Done Queue 403, a FIFO. The autoPM monitors the Done Queue 403 and when the transaction is complete, the context is copied from IO Descriptor RAM to CPU RAM, and an update is made in the translator RAM 401 indicating completion of that particular transaction.

It should be noted that the I/O descriptor RAM 512 is here only able to store context or status for 512 transactions. Thus, assume the translator RAM 401 indicates that there is a new 512th transaction. The autoPM 500 initiates a "swap" which will transfer the context of one of the 511 contexts stored in the I/O descriptor RAM 512 to the RAM 312 in the microprocessor 299. The protocol translator 400 selects the particular transaction context stored in the I/O descriptor RAM 512 to be transferred to the microprocessor RAM 312 based on some a priori criteria, such as, for example, the transaction having the least activity. In any event, the context for that here the least active transaction is transferred to the RAM 312 in the microprocessor 229 by the autoPM 500 thereby freeing up storage of the descriptors for the next new transaction. The translator RAM 410 keeps track of the particular transaction being swapped and changes the state of the swapped transaction with the "swapped" condition, or state.

If a burst of the swapped transaction is now in the protocol translator, the context of that transaction must be transferred to the I/O descriptor 512 under control of the autoPM 500 after the context of another transaction is swapped and stored in the RAM 312 of the microprocessor 299. Thus, there is always available space in the I/O descriptor RAM 512 for storage of context of a new transaction.

There is a performance monitor 550 monitoring each of the state machines 502, 504, 506, 508, 510. The status and condition stored in the monitor 550, here a set of registers, may be monitored or probed by the CPU 310 via the AutoPM 500. The information which may be recorded by performance monitor 550 includes counting events, measuring levels in queues, and timing the duration of events.

A number of embodiments of the invention have been described. Nevertheless, it will be understood that various modifications may be made without departing from the spirit and scope of the invention. For example, a change of the number of entries in I/O Descriptor 512 from 512 to 1024. Accordingly, other embodiments are within the scope of the following claims.

What is claimed is:

1. A data storage system for transferring data between a host computer/server and a bank of disk drives through a system interface, such system interface comprising:

a global memory;

a plurality of front-end directors coupled between the global memory and the host computer/server;

a plurality of back-end directors coupled between the global memory and the bank of disk drives;

wherein each one of the such front-end directors and each one of the back-end directors has a data pipe, each one of such front-end directors passing front-end data between the global memory and the host computer through the data pipe therein and each one of the back-end directors passing back-end data between the global memory and the bank of disk drives through the data pipe therein;

wherein each one of the front-end and back-end directors, comprises:
- a data pipe controller, responsive to data fed to the data pipe, for performing a selected one of a plurality of functions on the data passing through the data pipe to obtain data from the global memory or to read such data into the global memory, such selected one of the functions being determined by descriptors associated with the data fed to the data pipe therein;
- a plurality of different, independently operable state machines, each one being adapted to produce control signals for a corresponding one of the functions; and
- a switching section coupled to the global memory for passing data therethrough between the global memory and the data pipe in accordance with the control signals produced by the state machines.

2. The system recited in claim 1 wherein the global memory has a plurality of memory boards; and wherein the switching section includes a pair of independently controllable switches, each one of the switches is coupled to a different one of the memory boards.

3. The system recited in claim 2 wherein the data passes between the global memory and the directors as data transactions, each one of the transactions being transmitted as a plurality of bursts of data, bursts of one transaction being interleaved with bursts of other transactions, each burst having transaction context associated therewith, and wherein the system includes:
- a data transfer section having the global memory;
- a messaging network, operative independently of the data transfer section, coupled to the plurality of front-end directors and the plurality of back-end directors; and
- wherein the font-end directors and back-end directors control data transfer between the host computer and the bank of disk drives in response to messages passing between the front-end directors and the back-end directors through the messaging network to facilitate the data transfer between host computer/server and the bank of disk drives with such data passing through the cache memory in the data transfer section; and
- wherein each one of the front-end directors and each one of the back-end directors includes;
  - a message engine controller for transferring the messages between the message network and such one of the front-end directors and such one of the back-end directors; and
  - wherein such message engine controller includes a central processing unit having a microprocessor and a random access memory; and
- wherein the data flow controller includes:
  - a data pipe random access memory for storing context associated with a predetermined number of transactions;
  - a memory for maintaining the transactions having the context associated therewith stored in the data pipe memory; and
  - wherein the data pipe controller transfers context associated with additional transactions between the data pipe random access memory and the message engine random access memory.

4. The system recited in claim 1 including a performance monitor for monitoring performance of each one of the plurality of state machines.

* * * * *